United States Patent
Tomlinson

(10) Patent No.: US 11,063,437 B2
(45) Date of Patent: *Jul. 13, 2021

(54) SYSTEM FOR TRACKING AND ALLOCATING RENEWABLE ENERGY CONTRIBUTIONS TO A MODULAR RENEWABLE ENERGY SYSTEM

(71) Applicant: PV Solutions, LLC, Santa Monica, CA (US)

(72) Inventor: Joseph Tomlinson, Park City, UT (US)

(73) Assignee: PV Solutions, LLC, Portsmouth, RI (US)

( * ) Notice: Subject to any disclaimer, the term of this patent is extended or adjusted under 35 U.S.C. 154(b) by 207 days.

This patent is subject to a terminal disclaimer.

(21) Appl. No.: 16/442,658

(22) Filed: Jun. 17, 2019

(65) Prior Publication Data

US 2019/0305559 A1    Oct. 3, 2019

Related U.S. Application Data

(63) Continuation of application No. 14/855,683, filed on Sep. 16, 2015, now Pat. No. 10,326,278, which is a (Continued)

(51) Int. Cl.
  *G05B 15/02*    (2006.01)
  *G06Q 50/06*    (2012.01)
  (Continued)

(52) U.S. Cl.
  CPC .............. *H02J 3/383* (2013.01); *G05B 15/02* (2013.01); *G06Q 50/06* (2013.01); *H02J 7/35* (2013.01); *H04W 4/80* (2018.02); *H02J 3/06* (2013.01); *H02J 3/386* (2013.01); *H02J 13/0075* (2013.01); *H02J 2300/24* (2020.01); *Y02B 80/00* (2013.01);
  (Continued)

(58) Field of Classification Search
  None
  See application file for complete search history.

(56) References Cited

U.S. PATENT DOCUMENTS 3,360,491 A    12/1967   Axon
4,249,514 A    2/1981    Jones
(Continued)

FOREIGN PATENT DOCUMENTS

CA    2762078    6/2013
CN    201070989   6/2008
(Continued)

OTHER PUBLICATIONS

Brooks, et al., "Evaluation of Four Geomembrane-Mounted PV Systems for Land Reclamation in Southern Arizona," Journal of Energy and Power Engineering, 2013, vol. 7. pp. 834-840.
(Continued)

*Primary Examiner* — Jennifer L Norton
(74) *Attorney, Agent, or Firm* — Sheridan Ross P.C.

(57) ABSTRACT

A modular photovoltaic (PV) array system includes a PV array installed onto a fleet vehicle such as a trailer, bus etc., a host control system into which a plurality of fleet vehicles can connect to collectively generate electricity, and a subscriber system which collectively tracks energy generation and allocates respective contributions to the system.

18 Claims, 5 Drawing Sheets

Related U.S. Application Data continuation of application No. 13/602,392, filed on Sep. 4, 2012, now Pat. No. 9,142,967.

(60) Provisional application No. 61/530,565, filed on Sep. 2, 2011.

(51) Int. Cl.
| | |
|---|---|
| *H02J 7/35* | (2006.01) |
| *H02J 3/38* | (2006.01) |
| *H04W 4/80* | (2018.01) |
| H02J 13/00 | (2006.01) |
| H02J 3/06 | (2006.01) |

(52) U.S. Cl.
CPC .............. *Y02B 90/20* (2013.01); *Y02E 10/56* (2013.01); *Y02E 10/76* (2013.01); *Y04S 10/123* (2013.01); *Y04S 40/126* (2013.01)

(56) References Cited

U.S. PATENT DOCUMENTS

| | | | |
|---|---|---|---|
| 4,321,745 A | 3/1982 | Ford | |
| 4,592,436 A | 6/1986 | Tomei | |
| 4,993,959 A | 2/1991 | Randolph | |
| 5,121,583 A | 6/1992 | Hirai et al. | |
| 5,451,167 A | 9/1995 | Zielinski et al. | |
| 5,986,429 A | 11/1999 | Mula | |
| 6,088,688 A | 7/2000 | Crooks et al. | |
| 6,105,317 A | 8/2000 | Tomiuchi et al. | |
| 6,360,491 B1 | 3/2002 | Ullman | |
| 6,380,481 B1 | 4/2002 | Muller | |
| 6,672,018 B2 | 1/2004 | Shingleton | |
| 6,799,743 B2 | 10/2004 | Sawayanagi | |
| 7,293,824 B2 | 11/2007 | Dobson | |
| 7,307,209 B2 | 12/2007 | Mapes et al. | |
| 7,406,800 B2 | 8/2008 | Cinnamon et al. | |
| 7,592,537 B1 | 9/2009 | West | |
| 7,600,349 B2 | 10/2009 | Liebendorfer | |
| 7,694,466 B2 | 4/2010 | Miyamoto et al. | |
| 7,741,727 B2 | 6/2010 | Fein et al. | |
| 7,832,157 B2 | 11/2010 | Cinnamon | |
| 7,866,098 B2 | 1/2011 | Cinnamon | |
| 7,925,552 B2 | 4/2011 | Tarbell et al. | |
| 7,956,280 B2 | 6/2011 | Kobayashi | |
| 7,979,166 B2 | 7/2011 | Yamada et al. | |
| 7,987,641 B2 | 8/2011 | Cinnamon | |
| 8,039,733 B2 | 10/2011 | Kobayashi | |
| 8,092,129 B2 | 1/2012 | Wiley et al. | |
| 8,146,299 B2 | 4/2012 | Stearns et al. | |
| 8,176,693 B2 | 5/2012 | Abbott et al. | |
| 8,192,233 B2 | 6/2012 | Duesterhoeft et al. | |
| 8,196,360 B2 | 6/2012 | Metten et al. | |
| 8,220,569 B2 | 7/2012 | Hassan | |
| 8,240,109 B2 | 8/2012 | Cusson et al. | |
| 8,256,170 B2 | 9/2012 | Plaisted et al. | |
| 8,303,357 B2 | 11/2012 | Kuwahara | |
| 8,316,590 B2 | 11/2012 | Cusson | |
| 8,418,983 B2 | 4/2013 | Hartelius et al. | |
| 8,448,405 B2 | 5/2013 | Schaefer et al. | |
| 8,475,185 B2 | 7/2013 | Rivera et al. | |
| 8,495,997 B1 | 7/2013 | Laubach | |
| 8,571,922 B2 | 10/2013 | Zaloom | |
| 8,644,995 B2 | 2/2014 | Hinman et al. | |
| 8,661,765 B2 | 3/2014 | Schaefer et al. | |
| 8,761,948 B1 | 6/2014 | Ippolito et al. | |
| 8,813,441 B2 | 8/2014 | Rizzo | |
| 8,919,052 B2 | 12/2014 | West | |
| 8,938,919 B2 | 1/2015 | Cinnamon et al. | |
| 9,136,792 B2 | 9/2015 | Tomlinson | |
| 9,142,967 B2 | 9/2015 | Tomlinson | |
| 9,395,103 B2 | 7/2016 | Conley et al. | |
| 9,899,955 B2 | 2/2018 | Tomlinson | |
| 10,008,974 B2 | 6/2018 | Tomlinson | |
| 10,326,278 B2 | 6/2019 | Tomlinson | |
| 2006/0119106 A9 | 6/2006 | Borden et al. | |
| 2007/0120390 A1 | 5/2007 | Wheeler et al. | |
| 2007/0295391 A1 | 12/2007 | Lenox et al. | |
| 2008/0072949 A1 | 3/2008 | Rowell et al. | |
| 2008/0100258 A1 | 5/2008 | Ward | |
| 2008/0234421 A1 | 9/2008 | Hart et al. | |
| 2008/0265112 A1 | 10/2008 | Pascual et al. | |
| 2009/0250580 A1 | 10/2009 | Strizki | |
| 2009/0255573 A1 | 10/2009 | Taylor | |
| 2010/0138377 A1 | 6/2010 | Wright et al. | |
| 2010/0170163 A1 | 7/2010 | Tarbell et al. | |
| 2010/0192505 A1 | 8/2010 | Schaefer et al. | |
| 2010/0193012 A1 | 8/2010 | Klammer et al. | |
| 2010/0193260 A1 | 8/2010 | Freeman | |
| 2010/0207452 A1 | 8/2010 | Saab | |
| 2010/0224227 A1 | 9/2010 | Lindsey | |
| 2010/0228415 A1 | 9/2010 | Paul | |
| 2010/0236183 A1 | 9/2010 | Cusson et al. | |
| 2010/0278592 A1 | 11/2010 | Walker | |
| 2010/0294343 A1 | 11/2010 | Wexler et al. | |
| 2010/0314935 A1 | 12/2010 | Reichart et al. | |
| 2011/0025267 A1 | 2/2011 | Kamen et al. | |
| 2011/0031814 A1 | 2/2011 | Giesler | |
| 2011/0037600 A1 | 2/2011 | Takehara et al. | |
| 2011/0047903 A1 | 3/2011 | Kobayashi | |
| 2011/0072631 A1 | 3/2011 | Hartelius et al. | |
| 2011/0089887 A1 | 4/2011 | Ward | |
| 2011/0137752 A1 | 6/2011 | Arfom | |
| 2011/0138377 A1 | 6/2011 | Allen | |
| 2011/0151703 A1 | 6/2011 | Parker et al. | |
| 2011/0153098 A1 | 6/2011 | Tomita et al. | |
| 2011/0162779 A1 | 7/2011 | Stanley | |
| 2011/0173110 A1 | 7/2011 | Tarbell et al. | |
| 2011/0214366 A1 | 9/2011 | Haddock et al. | |
| 2011/0248137 A1 | 10/2011 | Barba | |
| 2011/0284058 A1 | 11/2011 | Cinnamon | |
| 2011/0308566 A1 | 12/2011 | Johnson | |
| 2011/0309786 A1 | 12/2011 | Hassan | |
| 2012/0022711 A1 | 1/2012 | Sakaguchi et al. | |
| 2012/0045286 A1 | 2/2012 | Oliveira | |
| 2012/0073885 A1 | 3/2012 | Glynn | |
| 2012/0085387 A1 | 4/2012 | French, Sr. | |
| 2012/0085394 A1 | 4/2012 | McPheeters et al. | |
| 2012/0102332 A1 | 4/2012 | Mullin | |
| 2012/0110931 A1 | 5/2012 | Eiffert et al. | |
| 2012/0125410 A1 | 5/2012 | West et al. | |
| 2012/0144828 A1 | 6/2012 | Lazaris | |
| 2012/0158205 A1 | 6/2012 | Hinman et al. | |
| 2012/0192926 A1 | 8/2012 | Kambara et al. | |
| 2012/0233958 A1 | 9/2012 | Stearns | |
| 2012/0255598 A1 | 10/2012 | West | |
| 2012/0260972 A1 | 10/2012 | West et al. | |
| 2012/0271576 A1 | 10/2012 | Kamel et al. | |
| 2012/0279558 A1 | 11/2012 | West et al. | |
| 2012/0298186 A1 | 11/2012 | West | |
| 2012/0298188 A1 | 11/2012 | West et al. | |
| 2012/0323635 A1 | 12/2012 | Arfin et al. | |
| 2012/0325290 A1 | 12/2012 | Gizara | |
| 2013/0061142 A1 | 3/2013 | Brier et al. | |
| 2013/0061189 A1 | 3/2013 | Brier et al. | |
| 2013/0061198 A1 | 3/2013 | Brier et al. | |
| 2013/0092457 A1* | 4/2013 | Wecker ................ | H01M 16/00 180/2.2 |
| 2013/0133270 A1 | 5/2013 | West et al. | |
| 2013/0140416 A1 | 6/2013 | West et al. | |
| 2013/0146554 A1 | 6/2013 | Berry et al. | |
| 2013/0167907 A1 | 7/2013 | Bitarchas et al. | |
| 2013/0180572 A1 | 7/2013 | West | |
| 2013/0180573 A1 | 7/2013 | West | |
| 2013/0180574 A1 | 7/2013 | West et al. | |
| 2013/0183084 A1 | 7/2013 | West et al. | |
| 2013/0192150 A1 | 8/2013 | DuPont et al. | |
| 2013/0200234 A1 | 8/2013 | Zhao et al. | |
| 2013/0213038 A1 | 8/2013 | Lazaris | |
| 2013/0262040 A1 | 10/2013 | Buckley | |
| 2014/0000916 A1 | 1/2014 | Ryba-White et al. | |
| 2014/0020230 A1 | 1/2014 | Jolley | |
| 2014/0020244 A1 | 1/2014 | Carlson et al. | |
| 2014/0025215 A1 | 1/2014 | Carlson et al. | |

(56) References Cited

U.S. PATENT DOCUMENTS

| | | |
|---|---|---|
| 2014/0025220 A1 | 1/2014 | Carlson et al. |
| 2014/0025344 A1 | 1/2014 | Brier et al. |
| 2014/0026946 A1 | 1/2014 | West et al. |
| 2014/0032178 A1 | 1/2014 | Kicinski et al. |
| 2014/0053891 A1 | 2/2014 | West et al. |
| 2014/0102997 A1 | 4/2014 | West et al. |
| 2014/0127935 A1 | 5/2014 | Scott et al. |
| 2014/0130847 A1 | 5/2014 | West et al. |
| 2014/0158184 A1 | 6/2014 | West et al. |
| 2014/0174511 A1 | 6/2014 | West et al. |
| 2014/0175244 A1 | 6/2014 | West et al. |
| 2014/0182661 A1 | 7/2014 | Kinyon |
| 2014/0182662 A1 | 7/2014 | West et al. |
| 2014/0220834 A1 | 8/2014 | Rizzo |
| 2014/0223838 A1 | 8/2014 | West et al. |
| 2014/0238467 A1* | 8/2014 | Martin ............... H02S 10/40 136/248 |
| 2014/0246549 A1 | 9/2014 | West et al. |
| 2014/0251431 A1 | 9/2014 | West et al. |
| 2014/0277797 A1 | 9/2014 | Mokhtari et al. |
| 2014/0277811 A1 | 9/2014 | Dunn et al. |
| 2014/0290155 A1 | 10/2014 | Conger |
| 2014/0326838 A1 | 11/2014 | West et al. |
| 2014/0338729 A1 | 11/2014 | Newman et al. |
| 2014/0358342 A1* | 12/2014 | Marks ............... B60L 8/003 701/22 |
| 2014/0360562 A1 | 12/2014 | Hartelius |
| 2015/0013756 A1 | 1/2015 | West et al. |
| 2015/0153394 A1 | 6/2015 | Carlson et al. |
| 2015/0200618 A9 | 7/2015 | West et al. |
| 2016/0207407 A1 | 7/2016 | Brady |
| 2018/0337627 A1 | 11/2018 | Tomlinson |
| 2018/0367088 A1 | 12/2018 | Tomlinson |
| 2020/0130525 A1* | 4/2020 | Son ............... B60L 53/51 |

FOREIGN PATENT DOCUMENTS

| | | | |
|---|---|---|---|
| CN | 101619711 | 1/2010 | |
| CN | 202081585 | 12/2011 | |
| EP | 0544625 | 6/1993 | |
| EP | 0905795 | 3/1999 | |
| FR | 2957953 | 9/2011 | |
| GB | 2499446 A * | 8/2013 | ............... H02J 3/008 |
| WO | WO 00/12839 | 3/2000 | |
| WO | WO 2007/093421 | 8/2007 | |
| WO | WO 2010/082653 | 7/2010 | |

OTHER PUBLICATIONS

Chaudhry, et al., "A V2G Application using DC Fast Charging and its Impact on the Grid," IEEE Transportation Electrification Conference and Expo, 2012, 6 pages.

Sampson, "Solar Power Installations on Closed Landfills: Technical and Regulatory Considerations," U.S. Environmental Protection Agency, 2009, 36 pages.

International Search Report and Written Opinion for International (PCT) Patent Application No. PCT/US12/63570, dated Nov. 16, 2012, 9 pages.

International Preliminary Report on Patentability for International (PCT) Patent Application No. PCT/US12/63570, dated Nov. 16, 2012, 7 pages.

Extended European Search Report for European Patent Application No. 12828760.4, dated Apr. 29, 2015, 8 pages.

Official Action for European Patent Application No. 12828760.4, dated Oct. 27, 2017, 4 pages.

Intention to Grant Patent for European Patent Application No. 12828760.4, dated Oct. 9, 2018 6 pages.

International Search Report and Written Opinion for International (PCT) Patent Application No. PCT/US12/53604, dated Nov. 26, 2012, 7 pages.

International Preliminary Report on Patentability for International (PCT) Patent Application No. PCT/US12/53604, dated Nov. 26, 2012, 6 pages.

International Search Report and Written Opinion for International (PCT) Patent Application No. PCT/US16/15390, dated Jul. 15, 2016, 10 pages.

International Preliminary Report on Patentability for International (PCT) Patent Application No. PCT/US16/15390, dated Aug. 10, 2017, 7 pages.

Official Action for U.S. Appl. No. 13/602,161, dated Jul. 29, 2014, 19 pages.

Notice of Allowance for U.S. Appl. No. 13/602,161, dated Apr. 24. 2015, 9 pages.

Official Action for U.S. Appl. No. 14/853,642, dated Jun. 3, 2016, 6 pages, Restriction Requirement.

Official Action for U.S. Appl. No. 14/853,642, dated Oct. 12, 2017, 9 pages.

Notice of Allowance for U.S. Appl. No. 14/853,642, dated Feb. 22, 2018, 7 pages.

Official Action for U.S. Appl. No. 16/016,864, dated Apr. 15, 2019, 6 pages. Restriction Requirement.

Notice of Allowance for U.S. Appl. No. 13/602,392, dated May 20, 2015, 21 pages.

Official Action for U.S. Appl. No. 14/855,683, dated Sep. 20, 2017, 12 pages, Restriction Requirement.

Official Action for U.S. Appl. No. 14/855,683, dated Dec. 8, 2017, 14 pages.

Official Action for U.S. Appl. No. 14/855,683, dated Jul. 19, 2018, 16 pages.

Notice of Allowance for U.S. Appl. No. 14/855,683, dated Feb. 6, 2019 19 pages.

Official Action for U.S. Appl. No. 15/009,265, dated Nov. 7, 2016, 8 pages, Restriction Requirement.

Official Action for U.S. Appl. No. 15/009,265, dated Dec. 15, 2016, 15 pages.

Notice of Allowance for U.S. Appl. No. 15/009,265, dated Aug. 2, 2017, 7 pages.

Official Action for U.S. Appl. No. 15/900,185, dated Jun. 6, 2019 6 pages Restriction Requirement.

* cited by examiner

ABSTRACT# SYSTEM FOR TRACKING AND ALLOCATING RENEWABLE ENERGY CONTRIBUTIONS TO A MODULAR RENEWABLE ENERGY SYSTEM

CROSS-REFERENCE TO RELATED APPLICATION

This application is a continuation of U.S. patent application Ser. No. 14/855,683, filed Sep. 16, 2015 (now issued as U.S. Pat. No. 10,326,278, issued Jun. 18, 2019) which is a continuation of U.S. patent application Ser. No. 13/602,392, filed Sep. 4, 2012 (now issued U.S. Pat. No. 9,142,967, issued Sep. 22, 2015), which claims the benefit of U.S. Provisional Application No. 61/530,565, filed Sep. 2, 2011, the entire contents of which are incorporated herein by reference.

BACKGROUND

The present invention relates to the generation of renewable energy, and more specifically to modular solar arrays and a system and method for tracking and allocating contributions to the system.

The increasing cost of diesel fuel, new regulations prohibiting idling and the use of diesel generators to power electrical systems while vehicles are at rest, and the increasing value of renewable energy credits is now reaching a point in the market where it is cost effective for transportation companies to invest in solar energy systems for their fleets. The trucks that transport goods around the country use tremendous amounts of diesel fuel, not just to fuel the engine, but also to drive the electrical systems of the trucks. While in motion, additional horsepower is required to drive the electrical systems to maintain cab heating and air conditioning, lights, radios, GPS tracking systems and cooling systems for cargo, thus requiring the engine to work harder and burn more fuel. While stationary at a truck stop, the engines and/or on board generators are often left running for extended periods of time to continue to keep these electrical systems operating, burning additional fuel and contributing to poor air quality issues. The costs associated with running and maintaining auxiliary diesel generators are increasingly prohibitive and many companies are now at a crossroad where savings in fuel costs is critical not only to profitability, but to financial viability.

Solar energy is also at a crossroad where the solar panel systems are efficient enough and energy incentives are valuable enough to offset their initial costs over a reasonable period of time. Tied together with potential fuel savings in transportation systems, the combination may now be financially attractive to deserve large-scale deployment in the transportation industry.

SUMMARY

There is believed to be a need in the industry for modular, mobile renewable energy systems that take advantage of the space available on the roofs of trailers and other fleet vehicles to generate renewable energy to reduce fuel costs, and in addition, a further need to be able to link the individual mobile arrays together into larger arrays to even further offset the costs of deployment.

The system includes a solar panel array mounted to the roof of the trailer that will generate a portion of the electricity required by the truck while in motion thus reducing the load on the alternator and reducing fuel costs. The same solar array will generate an even greater portion of the electricity required by the truck while stationary at a truck stop or at any facility beginning with the truck's point of origin to its destination. The system further includes a battery storage system located in the truck that will be used to store electricity and then drive the electrical systems when the truck is stationary and adequate sunlight is not available, allowing the operator to turn off the engine entirely.

This type of system by itself is now a viable investment to reduce fuel costs. However, the more important aspect of the invention is a modular subscriber system that permits a plurality of these solar equipped trailers to be plugged into a local host to create a modular array that will provide power to a local facility and potentially feed power into the electrical grid. A further aspect of the invention is a network that links all of the hosts together into a system that can track individual contributions of each trailer or vehicle and allocate a credit to the owner to further generate income for the owner as an additional incentive to invest in the mobile PV array systems.

Accordingly, among the objects of the instant invention is the provision of a photovoltaic (PV) array that can be installed onto a fleet vehicle such as a trailer, bus etc. to reduce fuel costs.

Another object is the provision of a mobile PV array system that can be linked to a subscriber system to track Renewable Energy Credits (RECs) generated within a particular state.

Still another object of the invention is to provide a host control system into which a plurality of fleet vehicles can connect to collectively generate electricity.

Yet another object of the invention is to provide a subscriber system which collectively tracks energy generation and REC's.

Other objects, features and advantages of the invention shall become apparent as the description thereof proceeds when considered in connection with the accompanying illustrative drawings.

BRIEF DESCRIPTION OF THE DRAWING FIGURES

In the drawings which illustrate the best mode presently contemplated for carrying out the present invention:

DETAILED DESCRIPTION OF THE PREFERRED EMBODIMENT

Figure 5:
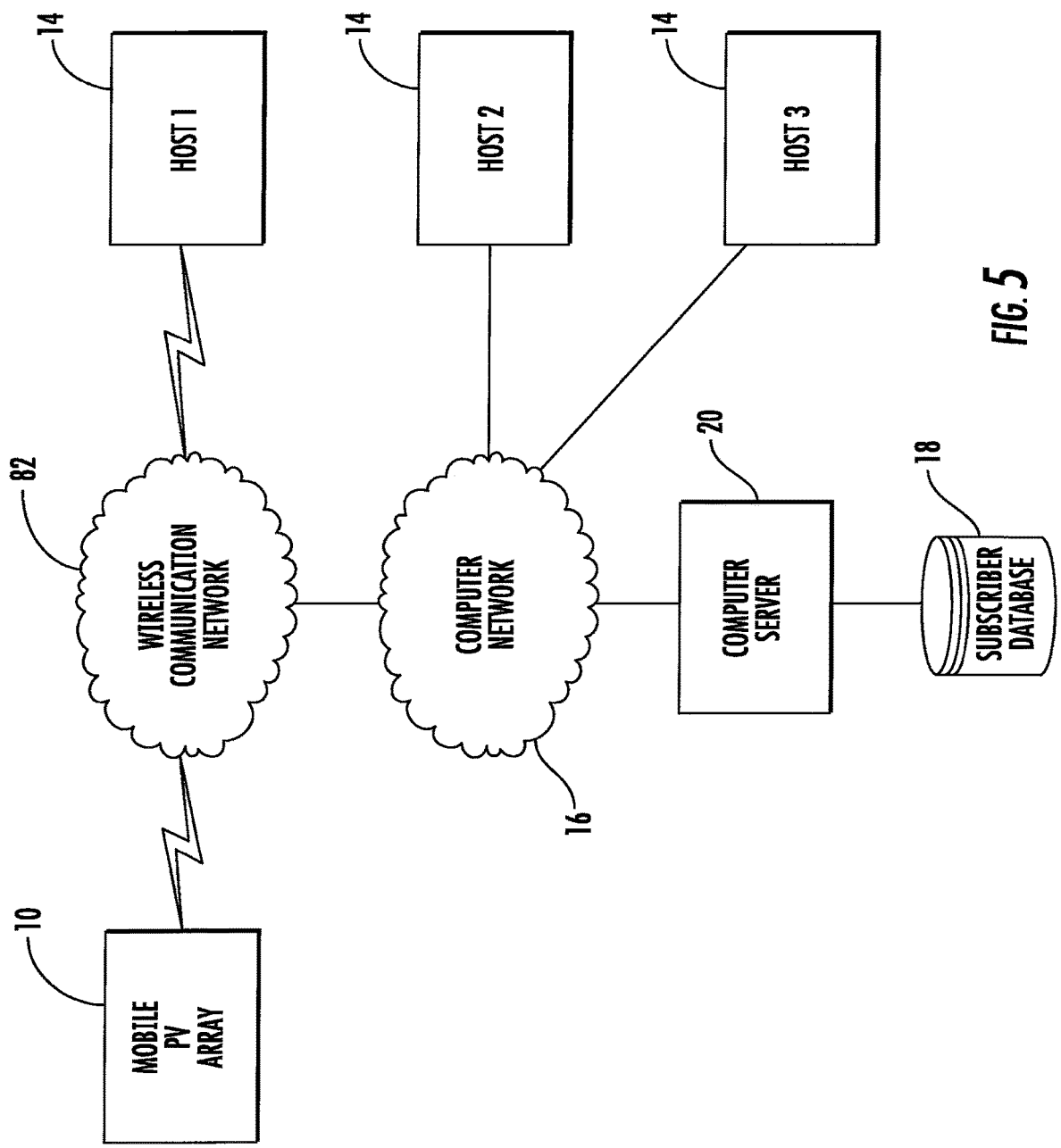
FIG. 5 is a schematic block diagram over the overall configuration of the modular array system.

Generally, the present invention provides a modular renewable energy tracking and allocation system including a plurality of renewable energy generating devices 10 (photovoltaic arrays) each having a device control system 12 and a respective device identification code, and a plurality of host renewable energy systems 14 (host facilities) each having a respective host identification code. The host systems 14 are each connected to a computer network 16 either by a wired connection or wirelessly through a cellular network or broadband WIFI (see FIG. 5).

The system further includes a network accessible subscriber database 18 for storing a plurality of database records containing subscriber data corresponding to the plurality of renewable energy generating devices 10 and the plurality of host renewable energy systems 14, and a computer server 20 in communication and the computer network. A software application running on the computer server 20 is operative communicating with the various host systems 14 and for writing data to and reading data from the subscriber database 18. The software application is also operative for managing owner/subscriber accounts and allocating energy credits to the owners based on individual energy contributions.

Each of the host facility systems 14 includes a plurality of connection ports 22 for receiving energy generated by the plurality of renewable energy generating devices 10, a central processing unit 24 in communication with the computer network 16 and the device control system 12, and a software application operating on the central processing unit 24 operative for measuring energy received from each of the plurality of renewable energy generating devices 10, generating energy data corresponding to the measured energy received from each of the plurality of renewable energy generating devices 10, associating the energy data with the respective device identification code, and sending the energy data with the associated device identification code and host identification code to the computer server 20 for storage on the subscriber database 18.

Figure 1:
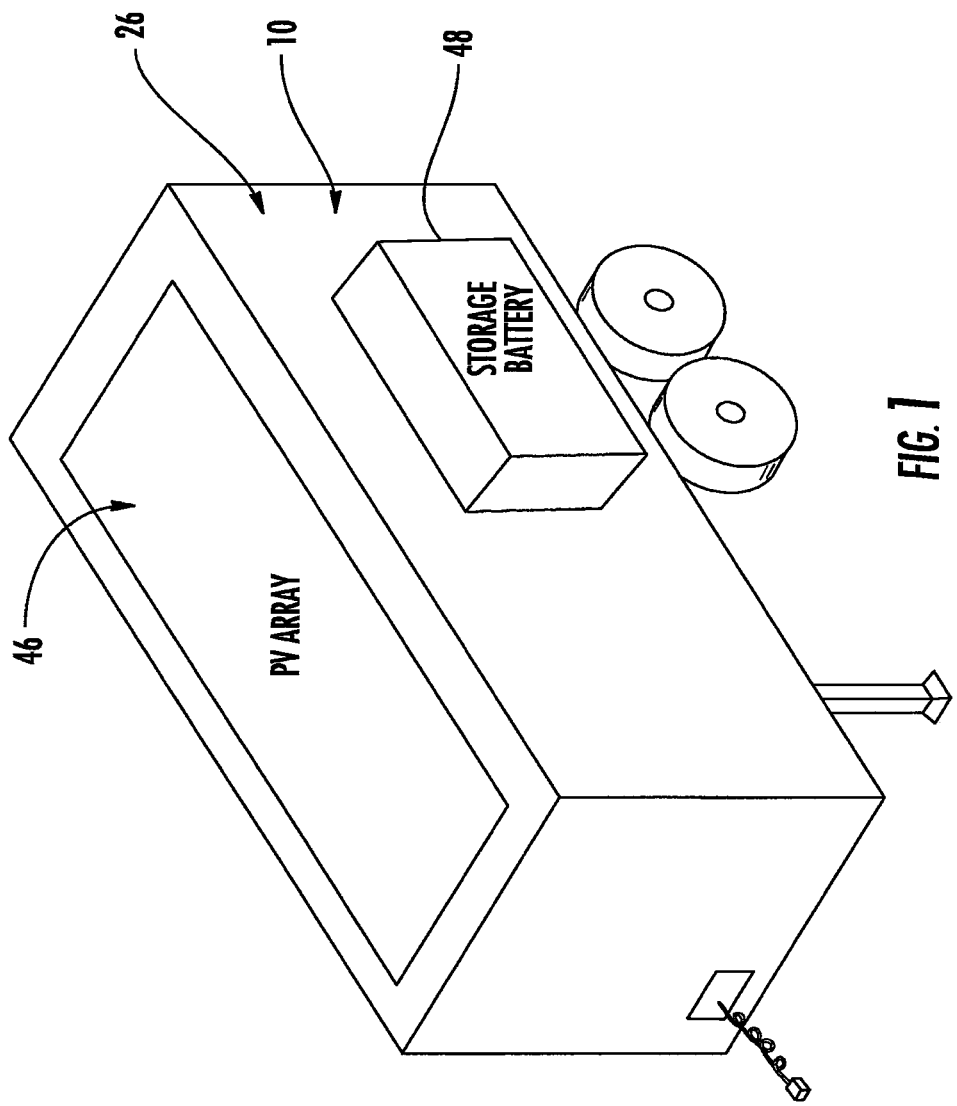
FIG. 1 is an illustration of a trailer including a PV array installed on its roof in accordance with the teachings of the present invention.

Referring to FIG. 1, there is shown a trailer 26. There are literally hundreds of thousands of such trailers in active use, or sitting in lots across the country. The invention provides renewable energy generating device 10, i.e. a solar photovoltaic system for installation onto the roof of the trailer 26. It should be understood that while the exemplary embodiment of the renewable energy system 10 as described herein is a photovoltaic array, the invention contemplates other renewable energy devices such as windmills, etc. which could eventually progress to a point where they could be used in a similar manner.

It should also be understood that while the exemplary embodiment herein is directed towards trailers, the system is equally applicable to containers, trains passenger buses, school buses, or other fleet vehicles having a significant roof space that can be utilized for a PV array. PV panels, PV arrays and PV electrical systems are well known and the specific details of the PV array and its operation will not be discussed in detail herein. FIG. 1 illustrates a simple arrangement showing a PV panel 10 installed onto the roof of the trailer 26. Multiple panel arrays are also contemplated.

Figure 2:
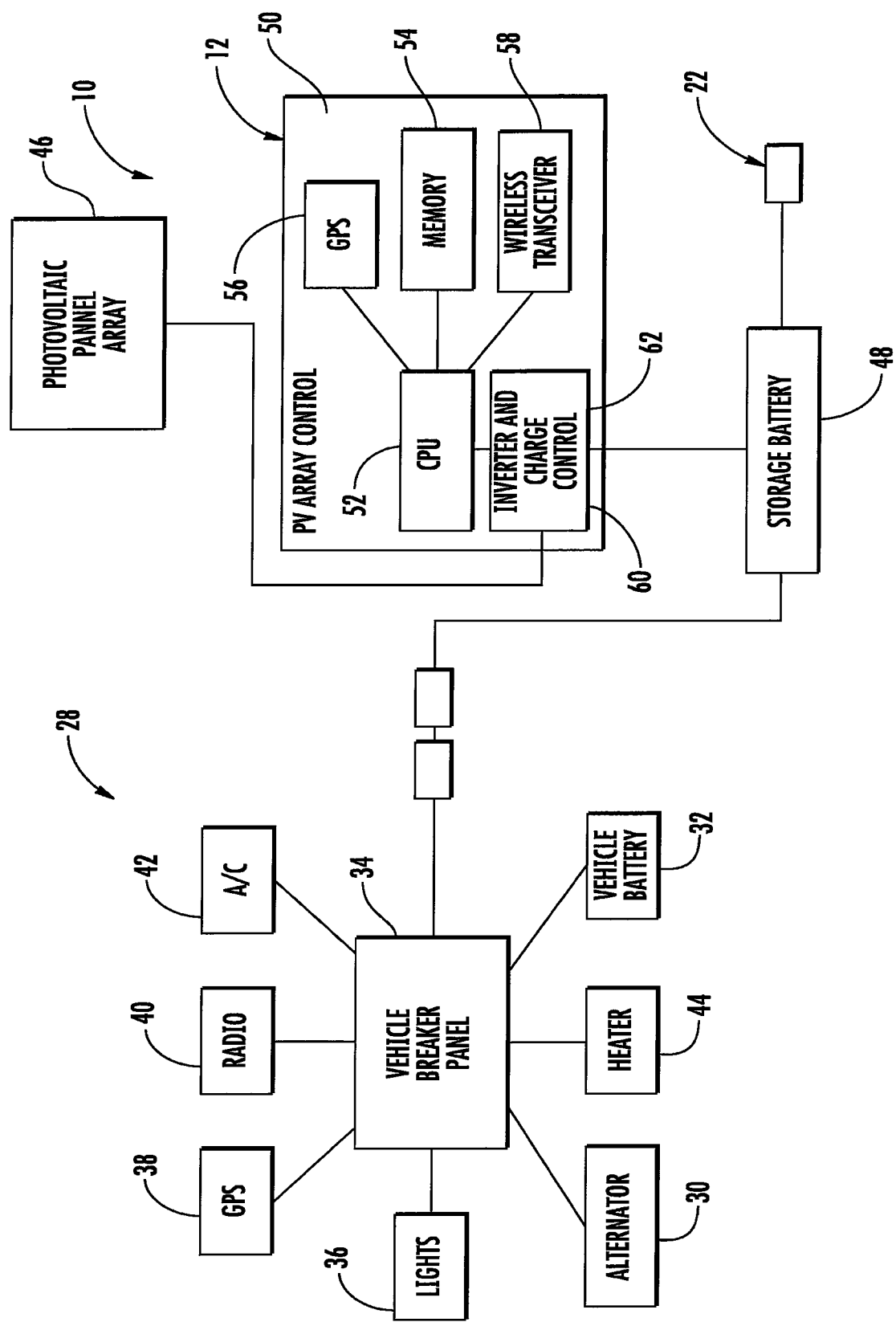
FIG. 2 is a schematic block diagram of the connections between the vehicle electrical system and the PV array system.

Turning now to FIG. 2, a block diagram of a tractor trailer electrical system 28 is shown in conjunction with the basic components of the PV array 10 mounted on the trailer 26. Generally, the vehicle electrical system 28 includes an alternator 30 to generate electricity, a battery 32, a breaker or fuse panel 34, and various electrical devices which draw a load from the system, i.e. lights 36, GPS 38, radio 40, air conditioning 42, heat 44, etc. The PV array system 10 includes the PV Array 46, a storage battery 48, and a PV array control system 50 including a CPU 52, a memory device 54, a GPS 56, a wireless transmitter 58, an inverter 60 and a charge controller 62. The PV array system 10 is connected directly into the vehicle electrical system 28 and delivers electrical power to the vehicle electrical system 28. Any electrical power generated reduces the load on the alternator 30 of the vehicle and ultimately saves fuel. Excess electricity can be stored in the battery 48 for use when the vehicle is idle.

Before proceeding with a further description of the subscription system of the invention, it will be helpful to understand several aspects of renewable energy distribution and the ways in which the solar energy generators can benefit from investment in solar infrastructure.

The first concept that should be understood is Net Metering. Solar-based systems are intermittent generators which only produce electricity when the sun is shining. When the sun is not shining, the generator does not produce power and may even use electricity for power electronics. Customer loads vary over time (e.g. lights, HVAC, plug loads, etc).

Customers who have a photovoltaic system will draw power from the electric grid when their generation does not meet the energy needs of the facility loads. These same customers may send power to the grid at times when their electric generation exceeds the energy needs of the facility. Net metering allows the customer to net out the energy drawn from the grid with energy sent to the grid over a billing period (billing month). For most small customers (residential and small business), the electric utility simply reads the retail meter at the beginning and end of the billing month to determine the net use or export.

At the end of a billing month, if a customer has used more energy than they have sent out to the grid (i.e. their meter reading went up during the billing month}, they will only have to pay energy related charges for the net energy used during the billing month. They used all the energy produced by their generator during the billing month, and this reduced the energy they had to purchase from the utility. If the customer has sent more energy to the grid than was drawn from the grid during the billing month (i.e. their meter reading went down during the billing month), then the customer is a net exporter during that billing period. When a customer is a net exporter during a billing period, they are billed for zero kilo-watt hour usage and a renewable generation credit will be applied to the account. In markets that allow for Virtual Net Metering, the customer can sell energy generated to a third party under a Power Purchase Agreement (PPA).

The next concept that should be understood is Renewable Energy Credits. Renewable Energy Certificates (RECs), also known as Green tags, Renewable Energy Credits, Renewable Electricity Certificates, or Tradable Renewable Certificates (TRCs), are tradable, non-tangible energy commodities in the United States that represent proof that 1 megawatt-hour (MWh) of electricity was generated from an eligible renewable energy resource (renewable electricity). Solar Renewable Energy Certificates (SRECs) are RECs that are specifically generated by solar energy.

These certificates can be sold and traded or bartered, and the owner of the REC can claim to have purchased renewable energy. RECs represent the environmental attributes of the power produced from renewable energy projects and are sold separate from commodity electricity. It is important to understand that the energy associated with a REC is sold separately and is used by another party. The consumer of a REC receives only a certificate.

In states that have a REC program, a green energy provider (such as a solar power generator) is credited with one REC for every 1,000 kWh or 1 MWh of electricity it produces (for reference, an average residential customer consumes about 800 kWh in a month). A certifying agency gives each REC a unique identification number to make sure they can be tracked effectively. The green energy is then fed into the electrical grid (by mandate), and the accompanying REC can then be sold on the open market.

There are two main markets for RECs in the United States: compliance markets and voluntary markets. Compliance markets are created by government policies that exist in at least 29 states, called Renewable Portfolio Standards (RPS). In these states, the electric companies are required to supply a certain percent of their electricity from renewable generators by a specified year. For example, in California the law is 33% renewable by 2020, whereas New York has a 24% requirement by 2013. Electric utilities in these states demonstrate compliance with their requirements by purchasing RECs.

Voluntary markets are ones in which customers choose to buy renewable power out of a desire to use renewable energy. Most corporate and household purchases of renewable energy are voluntary purchases. Renewable energy generators located in states that do not have a Renewable Portfolio Standard can sell their RECs to voluntary buyers, usually at a cheaper price than compliance market RECs.

The object of the invention is to create a network and subscription system where a plurality of host facilities 14 install and operate modular power systems that will allow a plurality of solar equipped vehicles or trailers 10 to be connected to the system to collectively increase the generating capacity of the host system. Each mobile array 10 is identified by a unique identification code. Each facility 14 is also identified by a unique identification code. The owners of the trailers and hosts establish accounts on the subscription system and link each of their properties to their account. This subscriber data is stored in the subscriber database 18 (See FIG. 5).

Figure 3:
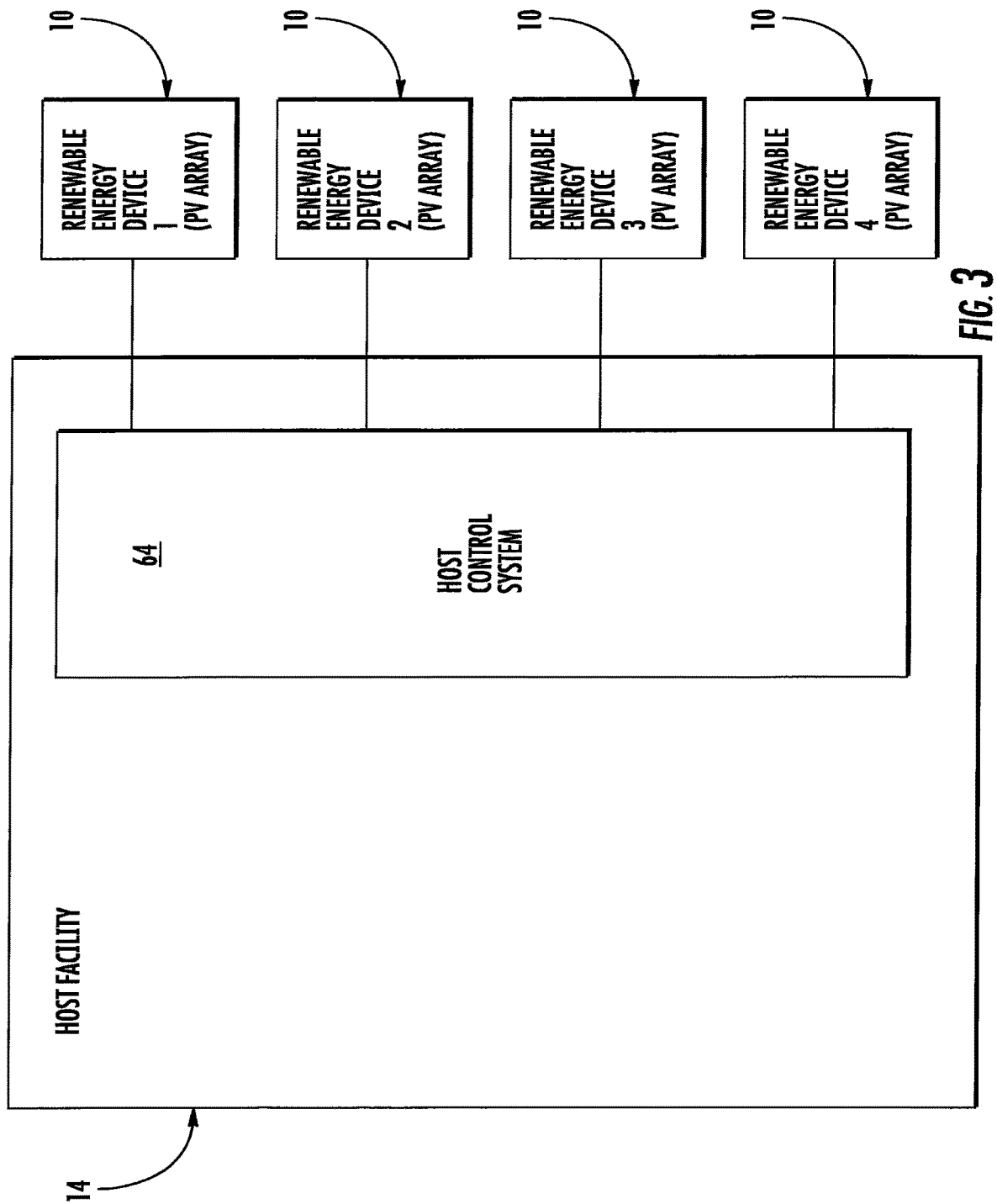
FIG. 3 is a schematic block diagram of the modular array system of a single host.
Figure 4:
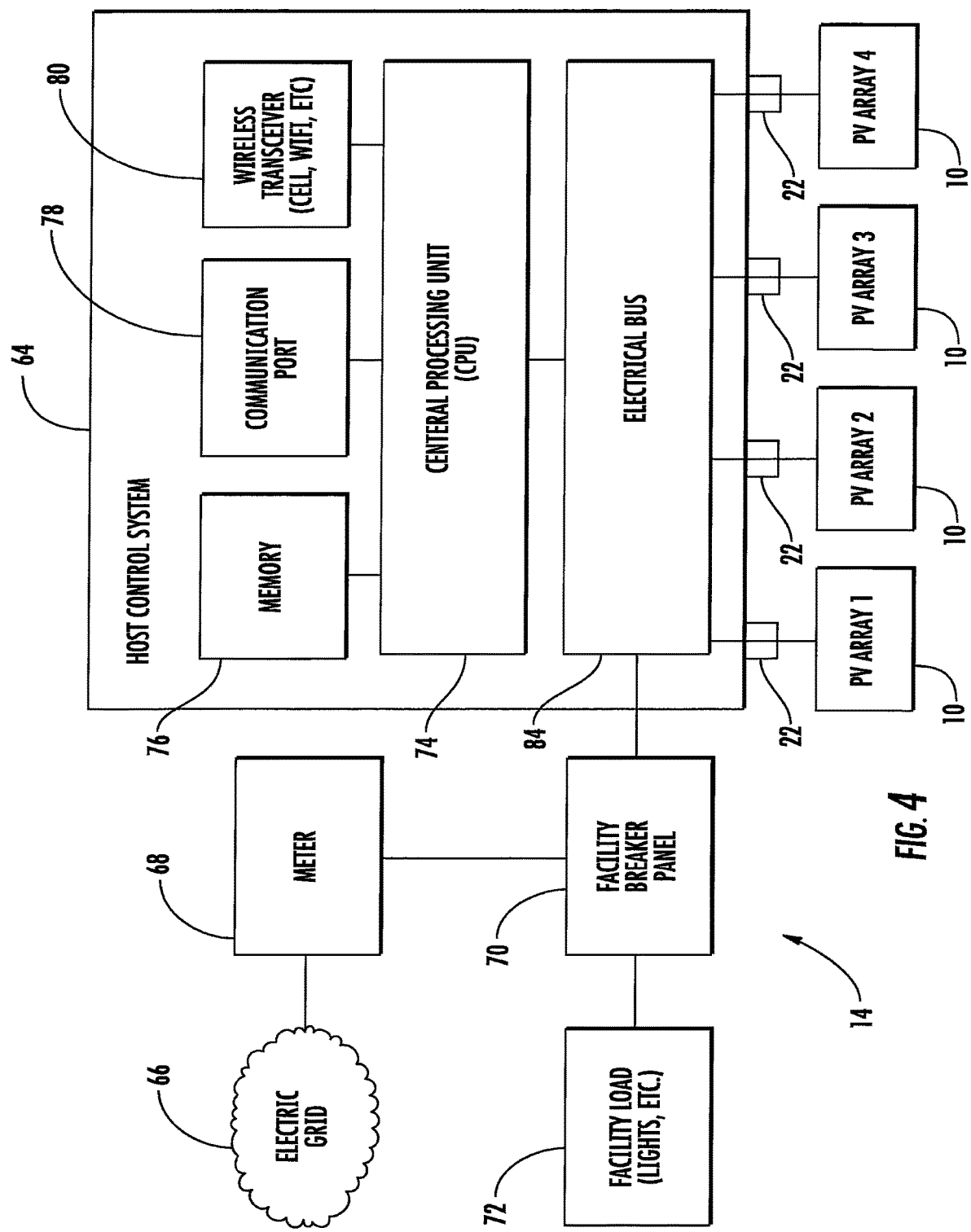
FIG. 4 is a more detailed block diagram thereof.

Turning to FIG. 3, a basic block diagram of the local modular host system is illustrated. The facility or host 14 installs and operates a solar power system having a host renewable energy control system 64 and a plurality of connection ports 22 for connecting to multiple solar equipped trailers 10 (renewable energy generating devices 1-4). FIG. 4 is a more detailed block diagram. On the left side of FIG. 4, the host is connected to the electrical grid 66 through a meter 68 and a breaker panel 70. The breaker panel 68 feeds multiple devices, which draw a load 72 from the system. On the right side, the renewable energy host system includes the host control system 64 and in accordance with the invention, and a plurality of solar equipped trailers 10 (renewable energy generating device) are connected to the system 64 through the electrical connector ports 22. The host control system 64 includes a CPU 74, memory 76, a communication port 78 for connection to the computer network 16, a wireless transceiver 80 (cellular or broadband WIFI) for wireless communication with a wireless communication network 82 and the computer network 16 (See FIG. 5), and an electrical bus 84 to deliver the solar power into the facility breaker panel 70. The individual device ID's are communicated to the host control system 64 by either a wired connection or wirelessly.

In a Net Metering scheme, the host facility 14 gets the benefit of the electricity generated from the solar power system 64 by reducing the amount of power it draws from the grid 66. This translates into direct monetary savings for the host 14. However, the object of the subscription system is to provide incentive to the owners of the vehicles or trailers to install the mobile solar arrays 10 onto the vehicles and then connect those mobile arrays 10 to a host 14 when stationary. Accordingly, the host system software is configured to monitor and track the individual contribution of each mobile array 10, calculate a credit for the contribution and submit the credit to the subscriber system. The credit is then deposited into the owner's account. To incentivize the host 14, the host pays less for energy supplied through the system than it would otherwise pay the utility for the energy, or less than the value it receives from the Net Metering credit. In this manner, both the host and the mobile array owner benefit.

Additionally, the host 14 can apply to receive status as a renewable energy generator and receive Renewable Energy Credits (RECs). As described hereinabove, REC's are extremely valuable in states with RPS policies and provide additional incentive for both the host and the mobile array owners to participate in the system. If a host is an authorized REC generator, it can receive RECs for the power generated from the modular mobile array it operates and can then sell those REC's. If the host is a REC generator, it can then provide an increased credit to the individual array owners combining both the credit for the electricity generated as well as a credit attributed to future sale of a REC that the array owner contributed to creating.

Finally, it is also contemplated that individual mobile array owners can be credited for solar energy generated by the devices 10 while in motion. The mobile PV array control software can monitor energy generated by the PV array 10 while travelling. As indicated above, certain states have very valuable incentive systems for generating green energy. The mobile PV system 10 can periodically upload data (wireless cellular or broadband WIFI) (see FIG. 5) identifying energy created including location as determined by the device GPS 56, time stamps and ID codes to credit the owner's account with energy created while in motion. For example, a solar equipped tractor trailer on the NJ turnpike will generate a specific amount of energy and the owner can receive a credit through the subscriber system. That credit can be combined with credits generated by other mobile solar arrays to generate a REC that could later be sold for value.

Accordingly, it can be seen that the present invention provides a modular PV array and credit allocation system that will incentivize fleet owners to invest in solar infrastructure. The system provides a unique and novel, photovoltaic array system which is installed onto a fleet vehicle such as a trailer, bus etc. to reduce fuel costs, a mobile PV array system that can be linked to a subscriber system to track Renewable Energy Credits (RE Cs), a host control system into which a plurality of fleet vehicles can connect to collectively generate electricity, and a subscriber system which collectively tracks energy generation and REC's.

For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim.

What is claimed is:

1. A modular renewable energy tracking and allocation system comprising:
   a photovoltaic array mounted on a vehicle having a device control system and a respective device identification code;
   a host renewable energy system having a respective host identification code;
   a computer network;

a network accessible database storing a plurality of database records containing data corresponding to said photovoltaic array and said host renewable energy system;

a computer server in communication with said computer network;

a software application running on said computer server for writing data to and reading data from said network accessible database;

said host renewable energy system including, a connection port for receiving energy generated by said photovoltaic array, a central processing unit in communication with said computer network and said device control system, and a software application operating on said central processing unit operative to measure energy received from said photovoltaic array, generating energy data corresponding to said measured energy received from said photovoltaic array, associating said energy data with said respective device identification code, and sending said energy data with said respective device identification code and said host identification code to said computer server for storage on said network accessible database; wherein said central processing unit of said host renewable energy system is in communication with said computer network, and wherein an owner of the vehicle is credited for solar energy generated by the photovoltaic array while the vehicle is in motion.

2. The modular renewable energy tracking and allocation system of claim 1 wherein said device control system of said photovoltaic array is in wired communication with a central processing unit of said host renewable energy system.

3. The modular renewable energy tracking and allocation system of claim 1 further comprising: a wireless communication system, said computer network is in communication with said wireless communication system, said photovoltaic array including a wireless transceiver for wirelessly communicating with said wireless communication system, said device control system having a software application operating to generate energy data corresponding to energy generated while said renewable energy system is not connected to a host, said device control system sending said energy data with said respective device identification code to said computer server for storage on said network accessible database.

4. The modular renewable energy tracking and allocation system of claim 1 wherein said host renewable energy system includes an electrical bus and inverter which is connected to a host breaker.

5. The modular renewable energy tracking and allocation system of claim 1 wherein said host renewable energy system further comprises: a memory device, said software application running on said central processing unit of said host renewable energy system temporarily storing said energy data and said respective device identification code in said memory device prior to sending.

6. The modular renewable energy tracking and allocation system of claim 1 wherein the photovoltaic array is linked to a separate photovoltaic array mounted on another vehicle to form a larger array.

7. The modular renewable energy tracking and allocation system of claim 1, further comprising a modular subscriber system that permits a plurality of vehicles to be plugged into a local host to create a modular array that provides power to one of a local facility and an electrical grid.

8. The modular renewable energy tracking and allocation system of claim 1 wherein said vehicle is selected form a group consisting of a trailer, a mobile container, a train, a passenger bus, a school bus, and a fleet vehicle.

9. The modular renewable energy tracking and allocation system of claim 1, wherein said photovoltaic array generates a portion of electricity required by the vehicle while stationary.

10. The modular renewable energy tracking and allocation system of claim 1 wherein the modular renewable energy tracking and allocation system periodically uploads data by one of wireless, cellular or broadband WIFI, and identifies energy created and a location of the vehicle, as determined by a device selected from a group consisting of a GPS, a time stamp and an ID code, whereby a credit is provided to the owner of a vehicle's account that comports with the energy created while the vehicle was in motion.

11. The modular renewable energy tracking and allocation system of claim 1, wherein said photovoltaic array is connected directly into an electrical system of the vehicle to deliver electrical power to the vehicle, and wherein electrical power generated by said photovoltaic array reduces a load on an alternator of the vehicle.

12. The modular renewable energy tracking and allocation system of claim 1, further comprising a network adapted to track individual contributions of the vehicle and to allocate a credit to the owner of the vehicle.

13. The modular renewable energy tracking and allocation system of claim 1 wherein the owner of the vehicle receives a status as a renewable energy generator to facilitate receiving Renewable Energy Credits (RECs).

14. A modular renewable energy tracking and allocation system comprising:

A photovoltaic array mounted on a vehicle having a device control system and a respective device identification code;

a host renewable energy system having a respective host identification code;

a computer network;

a network accessible database storing a plurality of database records containing data corresponding to said photovoltaic array and said host renewable energy system;

a computer server in communication with said computer network;

a software application running on said computer server for writing data to and reading data from said network accessible database;

said host renewable energy system including, a connection port for receiving energy generated by said photovoltaic array, a central processing unit in communication with said computer network and said device control system, and a software application operating on said central processing unit operative to measure energy received from said photovoltaic array, generating energy data corresponding to said measured energy received from said photovoltaic array, associating said energy data with said respective device identification code, and sending said energy data with said respective device identification code and said host identification code to said computer server for storage on said network accessible database;

a battery storage system located in the vehicle to store electricity and to supply electricity to said vehicle when the vehicle is stationary and when sunlight is not available;

wherein the photovoltaic array is linked to a separate photovoltaic array mounted on another vehicle to form a larger array; and wherein said vehicle is selected from a group consisting of a trailer, a mobile container, a train, a passenger bus, a school bus, and a fleet vehicle.

15. The modular renewable energy tracking and allocation system of claim 14 further comprising: a wireless communication system, said computer network is in communication with said wireless communication system, said photovoltaic array including a wireless transceiver for wirelessly communicating with said wireless communication system, said device control system having a software application operating to generate energy data corresponding to energy generated while said renewable energy system is not connected to a host, said device control system sending said energy data with said respective device identification code to said computer server for storage on said network accessible database.

16. The modular renewable energy tracking and allocation system of claim 14, further comprising a modular subscriber system that permits a plurality of vehicles to be plugged into a local host to create a modular array that provides power to one of a local facility and an electrical grid.

17. The modular renewable energy tracking and allocation system of claim 14 wherein an owner of the vehicle receives a status as a renewable energy generator to facilitate receiving Renewable Energy Credits (RECs).

18. The modular renewable energy tracking and allocation system of claim 14, further comprising a network adapted to track individual contributions of the vehicle and to allocate a credit to an owner of the vehicle.

* * * * *